April 13, 1948. C. B. KASBOSKE 2,439,518
DRAW BAR
Filed Oct. 3, 1945
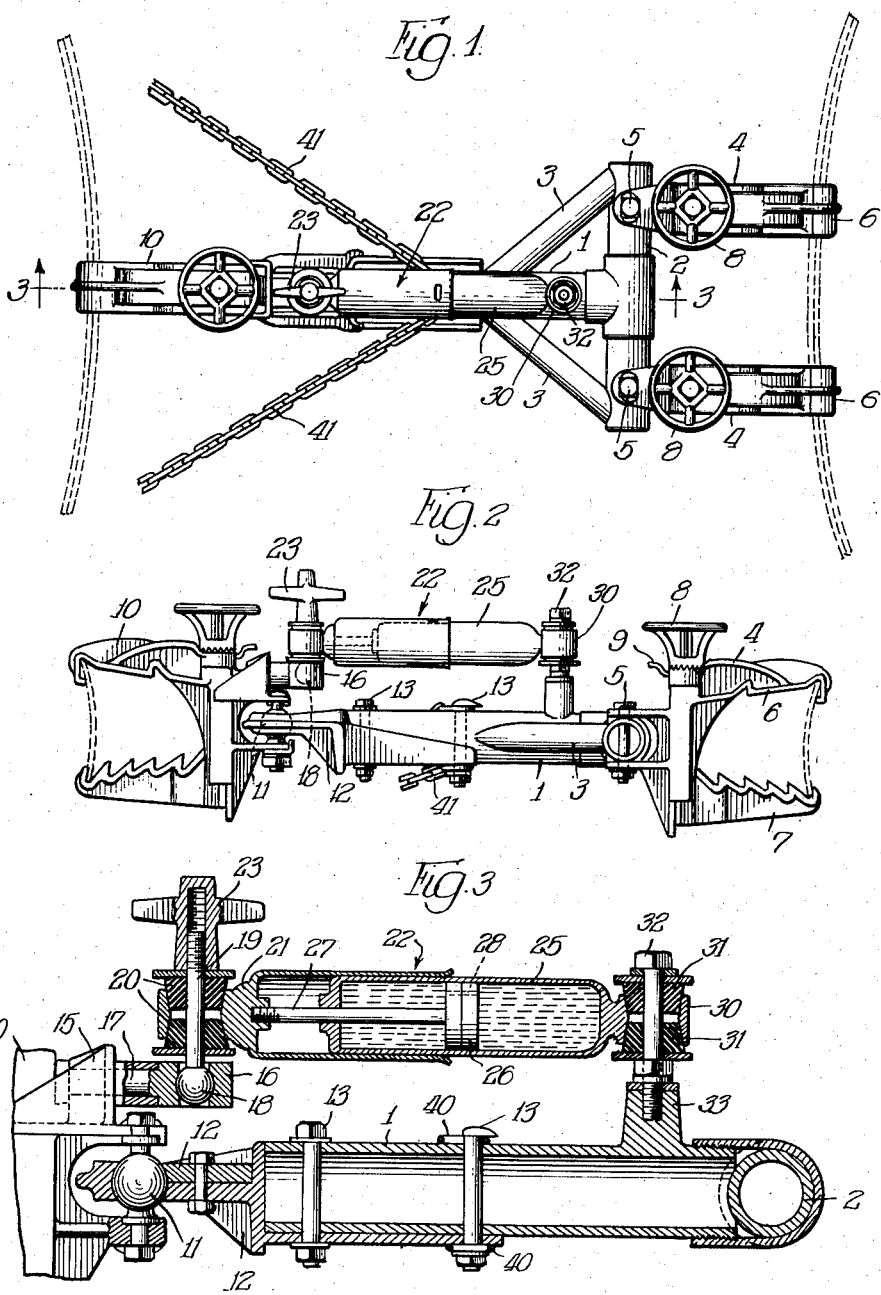
INVENTOR.
Clement B. Kasboske,
BY George H. Simmons
Atty.

Patented Apr. 13, 1948

2,439,518

UNITED STATES PATENT OFFICE 2,439,518

DRAW BAR

Clement B. Kasboske, Chicago, Ill., assignor to Martin Loeber, Chicago, Ill.

Application October 3, 1945, Serial No. 620,112

11 Claims. (Cl. 280—33.14)

This invention relates to a draw bar for towing vehicles and has as its principal object provision of a new and improved draw bar of this type.

It is a main object of the invention to provide a draw bar that can be quickly attached to the opposed bumpers of a towing and a towed car without the use of special tools.

Another object of the invention is to provide a draw bar that is capable of towing an unattended vehicle without locking the steering gear of that vehicle.

Another object of the invention is to provide a draw bar that will cause an unattended vehicle to follow the towing vehicle as that vehicle negotiates curves and corners and as it passes over irregularities in the roadway.

Still another object of the invention is to provide a tow bar that can be economically manufactured as a rugged unit capable of towing cars and trucks, and capable of being maintained in operative condition at low cost.

Further objects of the invention not specifically mentioned here will be apparent from the detailed description and claims which follow, reference being had to the accompanying drawings in which a preferred embodiment of the invention is shown by way of example, and in which:

Figure 1 is a plan view of the draw bar attached to the bumpers of two vehicles;

Figure 2 is a side elevational view of the draw bar; and

Figure 3 is a fragmentary cross sectional view taken substantially along the line 3—3 of Figure 1 looking in the direction of the arrows.

Draw bars for towing a vehicle, such as an automobile, behind another similar vehicle, are old in the prior art of which I am aware. When using these prior art devices the towed car has been attended by an operator to steer the same and to apply the brake as needed, or if the towed car has been unattended it has been necessary to lock the steering gear, with the wheels of the vehicle aligned. In certain of these prior art devices elaborate cross connections are employed to cause movement of the towing vehicle in turning to manipulate the steering gear of the towed vehicle.

The present invention improves upon these prior art devices by providing a draw bar that is of simple construction and easily attached to the vehicles and is capable of towing an unattended vehicle without locking the steering gear of that vehicle, and without the use of steering connections between the vehicles.

In its preferred form the draw bar of the present invention consists of a tongue rigidly attached to the towed vehicle and attached to the towing vehicle by a connection which permits movement in all directions except forward and aft, this connection being shunted or by-passed by a suitable device, such as a double-acting shock absorber arranged to resist movement of the tongue with respect to the towing vehicle. This resistance is a yielding resistance and does not interfere with the negotiations of turns and corners and changes in elevation of the roadway. The yielding resistance does, however, hold the towed vehicle steady in line so that the caster effect of the front wheel suspension of that vehicle will cause it to accurately follow the towing vehicle without weaving.

As will be seen in the drawings, particularly Figures 1 and 2, in its preferred form the draw bar consists of the tongue 1 having a cross bar 2 disposed at its one end and centered on the axis of the tongue 1. Suitable brace members 3 extend between the tongue and the ends of the cross bar. As shown, the tongue, cross bar and braces are of tubular construction and welded together, this construction being advantageous for the reason that it results in a strong unit of relatively light weight.

Attached to the cross bar 2 near the outer ends thereof are a pair of clamps 4 which are secured to the cross bar by suitable bolts or rivets 5. The connection between the clamps and cross bars permits limited movement of the clamp around the bolts 5 as a pivot to facilitate fitting the clamp onto the bumper of the towed vehicle, however, when this connection is made the tongue is maintained rigidly with respect to the towed vehicle.

The particular type of clamp employed is not of the essence of the present invention, as there are several clamps available on the open market which are suitable for this purpose, such as, for example, the clamps shown in the Thorp Patents 2,250,661 and 2,306,007. Such clamps consist essentially of a stationary jaw 6 and a movable jaw 7, both of which contain numerous recesses and shoulders which permit the clamp to engage and be firmly secured to various shapes of bumpers without marring the same. The clamps are provided with a hand wheel 8 by which the movable jaw is operated and a latch 9 which holds the hand wheel against rotation, thereby to hold the clamp secure on the bumper. The particular type of clamp is not of the essence of the present invention and the clamps shown are shown by way of example only.

Attached to the rear bumper of the towing car is a single clamp 10 that carries a ball 11 that is engaged by a socket means 12 that is secured to the free end of the tongue 1 in any preferred manner, such as by bolts or rivets 13. The ball and socket joint permits limited movement of the tongue in all directions except that the distance between the forward and aft clamps is fixed. While a ball and socket joint is shown, other types of connections permitting limited movement may be substituted within the teachings of the invention.

Mounted upon the clamp 10 is a bracket 15 that carries a socket 16 that is secured to the bracket by a shaft 17, that permits the socket to rotate around a substantially horizontal axis. Fitted in the socket is the ball head 18 of a bolt 19 which bolt projects upwardly therefrom. A pair of resilient bushings 20 encircle the bolt 19 and are threaded through an eyelet in a casing 21 of a shock absorber unit 22. A wing nut 23 threaded on the bolt 19 secures the assembly thereon.

As shown, the shock absorber consists of a cylinder 25 which contains a piston 26 that is mounted on a shaft 27 that extends out of the cylinder through a suitable opening therein and connects with the casing 21. This casing has a cylindrical portion which fits around the outside of cylinder 25 to protect the shaft 27 from dust and dirt. A suitable fluid is encased in the cylinder on both sides of the piston and as the piston is moved this fluid vents through an opening 28 in the piston to resist the movement.

Cylinder 25 contains a mounting bracket 30 into which resilient bushings 31 are fitted. A bolt 32 projects through these bushings and into a suitable boss 33 on the tongue to secure the cylinder thereon. Resilient bushings 20 and 31 may be composed of rubber or a rubber impregnated fabric. The bushings permit the shock absorber element to turn with respect to the bolts 19 and 32 and serve also to cushion slight shocks and to guard against noise.

It will be noted that the center of the ball 18 is offset both vertically and horizontally from the center of the ball 11 to provide a lever arm. As the towing vehicle turns to go around a corner the tongue 1 will turn on the ball around a vertical axis, ball 18 will move around the same vertical axis, and these movements will be resisted by the shock absorber. With the tongue aligned straight behind the towing vehicle the piston 26 will be located at the approximate center of the cylinder 25 and turning of the tongue in either direction will move the piston to the left Figure 3, building up pressure against the fluid in amount determined by the size of the ports 28 in the piston. As soon as the tongue ceases to turn about vertical axis through the ball 11, the pressure on the two faces of the piston equalizes. As a result when turning or negotiating a sweeping curve there is a retarding force on the tongue tending to resist change of position of the tongue relative to the vehicle, which force aids in keeping the towed vehicle in line with the towing vehicle and prevents side swaying of the towed vehicle.

As a result of this action when the vehicles are traveling on a straight away the towed vehicle will follow in a straight line behind the towing vehicle without weaving and without appreciable side sway. The caster effect of the front wheel suspension of the towed vehicle keeps that vehicle in line without a shimmy. When a curve or sharp turn is negotiated the towed vehicle follows accurately, also without side sway or shimmy.

When moving over a roadway, sudden elevations in the road, such as are encountered in going over crossings and the like, will produce a relative movement of the tongue and clamp around a horizontal axis through the ball 11. The horizontal axis through the ball 18 is offset vertically from the axis through 11, with the result that movements of the tongue around the horizontal axis through 11 are resisted by the shock absorber in the same manner as movements around the vertical axis. Thus, if the front wheels of the towing vehicle are elevated as the vehicle runs over a crossing, relative movement of the tongue and clamp 10 will be upwardly, Figure 3, and the piston will be pushed to the right in the cylinder 25. When the front wheels drop as they will when the crossing is negotiated, and the back wheels of the towing vehicle are elevated, the relative movement between the tongue and clamp 10 will be in the opposite direction and piston 26 will be moved to the left, Figure 3. Both movements of the piston are resisted by the pressure built up on the fluid under the control of the ports 28. This retarding of the relative movement of the tongue and clamp causes the towed vehicle to follow smoothly behind the towing vehicle without undue bouncing.

In the drawings I have shown a hydraulic snubber of standard make for resisting movement of the tongue with respect to the clamp, this showing being by way of example only, as other types of shock absorbers and means other than shock absorbers may be used within the teachings of the invention. Shock absorbers lend themselves readily to this use, are readily available, and automobile mechanics are familiar with keeping them in proper working order.

The laws in many states require that the tongue of a tow bar be provided with safety chains that must be hooked onto the towing vehicle to prevent the towed vehicle from breaking loose in case of failure of the tow bar. To this end the tongue 1 is provided with suitable links 40 held under one of the bolts 13, and to which chains of suitable size and length are affixed.

In the drawings I have illustrated my invention by showing a tow bar equipped with clamps on both of its ends and adapted for use in towing vehicles such as automobiles and trucks. The invention is not limited to this use. The tongue 1 may equally well be the tongue of a two or a four wheeled trailer, within the teachings of the invention. Uses other than the example shown are contemplated.

The tow bar of my invention is possessed of many advantages. A bar capable of towing passenger cars and trucks is light enough to be readily handled by one man, it can be quickly attached to the towing and towed vehicles and when so attached permits towing a vehicle that is unattended. Forward and aft movement between the two vehicles is definitely prevented and the towed vehicle is held steady behind the leading vehicle without locking the steering gear. Standard parts are employed wherever possible, permitting the bar to be constructed at low cost and facilitating repairs should the bar become damaged.

While I have illustrated my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. A draw bar for towing vehicles comprising, a tongue, means rigidly securing said tongue to the vehicle that is to be towed, means securing said tongue to the vehicle that is to do the towing, said latter means permitting limited movement of the tongue around both vertical and horizontal axes through the means, and means extending between said latter means and said tongue for resisting movement of said tongue around said axes.

2. A draw bar for towing vehicles comprising, a tongue, means for securing said tongue to the vehicle that is to be towed, means for connecting said tongue to a towing vehicle, said latter means permitting limited movement of the tongue around both vertical and horizontal axes, a double-acting shock absorber, means connecting one end of said shock absorber to said tongue, said means permitting rotation of the shock absorber around a vertical axis, means connecting the other end of said shock absorber to said tongue connecting means at a point spaced away vertically and horizontally from said axes, said latter means permitting limited movement of the shock absorber around both vertical and horizontal axes.

3. A draw bar for towing vehicles comprising, a tongue, means rigidly securing said tongue to the vehicle that is to be towed, a clamp fixed upon the vehicle that is to do the towing, a ball carried by said clamp, a socket carried by said tongue and engaging said ball to connect the tongue to said clamp, a bracket carried by said clamp, a socket in said bracket, a ball fitted in said socket, a bolt secured to said ball, a shock absorber, means securing one end of said shock absorber to said bolt, means securing the other end of said shock absorber to said tongue thereby to resist movement of said tongue around said first ball.

4. A draw bar for towing vehicles comprising, a tongue, means for securing said tongue to the vehicle that is to be towed, means including a ball and socket joint for connecting said tongue to a towing vehicle, a double-acting shock absorber, means connecting one end of said shock absorber to said tongue, said means permitting rotation of the shock absorber around a vertical axis, means including a second ball and socket joint for connecting the other end of said shock absorber to said tongue connecting means, said second ball and socket joint being spaced both vertically and horizontally from said first ball and socket joint to enable said shock absorber to resist movement of the tongue around said first ball joint.

5. A draw bar for towing vehicles comprising, a tongue, means rigidly securing said tongue to the vehicle that is to be towed, a clamp fixed upon the vehicle that is to do the towing, means securing said tongue to said clamp said means permitting limited movement of the clamp with respect to the tongue around both vertical and horizontal axes, a bracket carried by said clamp, a shock absorber, means securing one end of said shock absorber to said bracket, said means permitting limited movement of said shock absorber around vertical and horizontal axes both offset from said first vertical and horizontal axes respectively and means securing the other end of said shock absorber to said tongue to enable it to resist movement around the first of said vertical and horizontal axes.

6. A draw bar for towing vehicles comprising, a pair of clamps adapted to be secured to a vehicle that is to be towed, a tongue secured to said clamps and extending forwardly therefrom, a clamp adapted to be secured to the vehicle that is to do the towing, means including a ball and socket joint connecting said tongue to said latter clamp, and means extending between said tongue and said latter clamp for resisting movement in said joint in all directions.

7. A draw bar for towing vehicles comprising, a pair of clamps adapted to be secured to a vehicle that is to be towed, a tongue secured to said clamps and extending forwardly therefrom, a clamp adapted to be secured to the vehicle that is to do the towing, means connecting said tongue to said latter clamp, said means permitting movement of the tongue around both vertical and horizontal axes through the means, and means extending between said tongue and said latter clamp for resisting movement of said tongue around said axes.

8. A draw bar for towing vehicles comprising, a tongue, clamp means securing said tongue to the vehicle that is to be towed, clamp means fixed on the vehicle that is to do the towing, means connecting said tongue to said latter clamp means, said connecting means permitting movement of the tongue around both vertical and horizontal axes through the means, and means extending between said tongue and said latter clamp means for resisting movement of said tongue around said axes.

9. A draw bar for towing vehicles comprising, a tongue, clamp means securing said tongue to the vehicle that is to be towed, clamp means fixed on the vehicle that is to do the towing, means connecting said tongue to said latter clamp means, said connecting means permitting movement of the tongue around both vertical and horizontal axes through the means, and a double-acting snubber extending between said tongue and said latter clamp means for resisting movement of said tongue around said axes.

10. A draw bar for towing vehicles comprising, a tongue, clamp means securing said tongue to the vehicle that is to be towed, clamp means fixed on the vehicle that is to do the towing, means connecting said tongue to said latter clamp means, said connecting means permitting movement of the tongue around both vertical and horizontal axes through the means, and a double-acting snubber extending between said tongue and said latter clamp means and pivoted to said clamp means at a point spaced from the intersection of said vertical and horizontal axes for resisting movement of said tongue around said axes.

11. A draw bar for towing vehicles, a tongue, a cross bar fixed at one end of said tongue and disposed at right angles thereto with the ends of the bar equidistant from the tongue, brace means fixed to the tongue and bar, a pair of clamps fixed to said cross bar, one near each end thereof, said clamps being adapted to engage the front bumper of a vehicle that is to be towed to secure the draw bar thereto, a clamp adapted to be fixed on the rear bumper of a vehicle that is to do the towing, a ball and socket joint connecting said tongue to said latter clamp, and a double acting shock absorber extending between said latter clamp and said tongue and adapted to resist movement of said tongue with respect to said clamp around both vertical and horizontal axes.

CLEMENT B. KASBOSKE.

REFERENCES CITED

The following references are of record in the file of this patent:

UNITED STATES PATENTS

| Number | Name | Date |
|---|---|---|
| 1,294,244 | Doe | Feb. 11, 1919 |
| 1,537,249 | Manley | May 12, 1925 |
| 1,668,079 | Irwin | May 1, 1928 |
| 1,812,733 | Ainslie | June 30, 1931 |
| 2,120,422 | Williams et al. | June 14, 1938 |
| 2,168,148 | Arehart | Aug. 1, 1939 |